United States Patent
Uehara et al.

(10) Patent No.: US 6,712,705 B2
(45) Date of Patent: Mar. 30, 2004

(54) DAMPER MECHANISM

(75) Inventors: Hiroshi Uehara, Hirakata (JP); Yasuhiko Fujita, Moriyama (JP)

(73) Assignee: Exedy Corporation, Osaka (JP)

( * ) Notice: Subject to any disclaimer, the term of this patent is extended or adjusted under 35 U.S.C. 154(b) by 0 days.

(21) Appl. No.: 10/042,197

(22) Filed: Jan. 11, 2002

(65) Prior Publication Data

US 2002/0094874 A1 Jul. 18, 2002

(30) Foreign Application Priority Data

Jan. 18, 2001 (JP) .................................. 2001-010636

(51) Int. Cl.7 ................................................ F16D 3/66
(52) U.S. Cl. ................................ 464/68; 192/205
(58) Field of Search .................. 464/66, 68; 192/203, 192/205, 213.2

(56) References Cited

U.S. PATENT DOCUMENTS

| | | | | |
|---|---|---|---|---|
| 1,013,925 A | * | 1/1912 | Bliss | .......................... 464/66 |
| 2,636,363 A | * | 4/1953 | Nutt | ............................ 464/68 |
| 4,185,728 A | * | 1/1980 | Gatewood | ................. 464/68 X |
| 4,475,725 A | * | 10/1984 | Niemann | |
| 4,679,678 A | * | 7/1987 | Habel, Jr. et al. | ............ 192/205 |
| 4,947,706 A | * | 8/1990 | Umeyama et al. | ......... 464/68 X |
| 5,014,842 A | * | 5/1991 | Graton et al. | ............. 464/68 X |
| 5,772,515 A | * | 6/1998 | Yamakawa et al. | ...... 192/205 X |
| 5,954,585 A | * | 9/1999 | Nagano et al. | ................ 464/68 |
| 6,416,417 B1 | * | 7/2002 | Kim | .......................... 464/68 X |
| 6,461,243 B1 | * | 10/2002 | Uehara | ......................... 464/68 |

FOREIGN PATENT DOCUMENTS

GB 2 183 006 * 5/1987 .............. 464/68.92

* cited by examiner

Primary Examiner—Greg Binda
(74) Attorney, Agent, or Firm—Shinjyu Global IP Counselors, LLP

(57) ABSTRACT

A damper mechanism that has a simplified structure and maintains torsional characteristics of a conventional damper mechanism is provided. The damper mechanism is equipped with an input rotating body 2, an output rotating body 3, and two or more coil spring assemblies 9. The two or more coil spring assemblies 9 elastically couple the input rotating body 2 and the output rotating body 3 together in a rotational direction and serve to absorb twisting torque. Each coil spring assembly 9 has at least one coil spring 41 whose center axis is roughly linear. At least one of coil spring assemblies 9 absorbs 35% to 50% of the twisting torque.

20 Claims, 8 Drawing Sheets

DAMPER MECHANISM

BACKGROUND OF THE INVENTION

1. Field of the Invention

This invention generally relates to a damper mechanism. More specifically, the present invention relates to a damper mechanism that uses a coil spring assembly.

2. Background Information

A conventional damper mechanism used in a clutch disk assembly of a vehicle has an input rotating member, an output rotating member, and an elastic coupling member. The input rotating member can be coupled to an input flywheel. The output rotating member is coupled to a shaft that extends from the transmission. The elastic coupling member elastically couples the input rotating member and the output rotating member in a rotational direction. The input rotating member has a clutch disk and a pair of input plates fixed to the inside thereof. The output rotating member has a hub that is coupled to the shaft such that the two cannot rotate relative to each other. The hub has a boss that is splined to the shaft and a flange that extends radially outward from the boss. The elastic coupling mechanism has a plurality of large, high-rigidity coil springs. Each coil spring is housed inside a window formed in the flange and furthermore is supported by windows formed in the pair of input plates. When the pair of input plates and the hub rotate relative to each other, the coil springs are compressed between the two members in the rotational direction. This damping function serves to absorb and damp rotational-direction torsional vibrations inputted to the clutch disk assembly.

A separated-flange type clutch disk assembly is also known. In the separated-flange type clutch disk assembly, the flange is independent from the hub and the flange and hub are coupled in the rotational direction by small, low-rigidity coil springs. With this type of clutch disk assembly, the small coil springs are compressed when in a region of small torsional angles and low-rigidity characteristics are obtained. Further, when in the region of large torsional angles, the large coil springs are compressed and high large-rigidity characteristics are obtained.

When the coil springs are compressed in the rotational direction, the deflection of the side of the coil springs that is farther from the center axis of the clutch disk assembly is larger than that on the side closer to the center axis. This is because the portion of the windows (which push the coil springs) farther from the center axis moves a larger distance in the rotational direction than does the portion closer to the center axis. As a result, the amount the inside wire twists to absorb the deflection of the part that is farther from the center axis is larger than the amount the outside wire twists. The stress on the inside wire is also larger. Thus, the stress generated on a single coil spring is not uniformly distributed and the life of the entire coil spring is shortened.

Also, the structure of conventional clutch disk assemblies is such that 3 to 12 springs are disposed in spring supporting parts provided at 3 to 6 locations positioned to the outside from the center axis in the radial direction. Consequently it is desirable to simplify the structure of the damper mechanism by reducing the number of coil spring assemblies. In particular, since the coil spring assemblies are disposed farther from the center axis of the clutch disk assembly than are the small coil springs, it is preferred to reduce the number of coil spring assemblies and enlarge the small coil springs so that designing can be simplified.

However, since the durability of the aforementioned coil springs is not sufficient, it is considered difficult to increase the torque capacity of the coil springs and reduce the number of coil spring assemblies.

In view of the above, there exists a need for a damper mechanism that overcomes the above mentioned problems in the prior art. This invention addresses this need in the prior art as well as other needs, which will become apparent to those skilled in the art from this disclosure.

SUMMARY OF THE INVENTION

An object of the present invention is to simplify the structure of the damper mechanism while maintaining the same torsional characteristics as conventional damper mechanisms.

A damper mechanism in accordance with a first aspect of the present invention has an input rotating body, an output rotating body, and two or more coil spring assemblies. The two or more coil spring assemblies elastically couple the input rotating body and the output rotating body together in a rotational direction and serve to absorb twisting torque. Each of the coil spring assemblies has at least one coil spring whose center axis is roughly linear. At least one of the coil spring assemblies absorbs 35% to 50% of the twisting torque.

In this damper mechanism, at least one of the two or more coil spring assemblies absorbs 35% or more of the twisting torque of the damper mechanism. Consequently, the number of coil spring assemblies can be reduced and the structure of the damper mechanism can be simplified while maintaining the same torsional characteristics as conventional damper mechanisms.

A damper mechanism in accordance with a second aspect of the present invention is the damper mechanism of the first aspect, wherein the coil springs are mounted such that the number of active coils on the side that is closer to the center axis of the damper mechanism is larger than the number of active coils on the side that is farther from the center axis of the damper mechanism.

This damper mechanism makes it possible to reduce the difference in per-coil deflection between the farther side and the closer side of the springs when the springs are compressed. In other words, the difference between the stress generated in the portion of each coil that is farther from the center axis and the stress generated in the portion of each coil that is closer to the center axis is reduced. As a result, the strength of the coil spring is improved and its torque capacity can be increased.

A damper mechanism in accordance with a third aspect of the present invention is the damper mechanism of the first or second aspect wherein the two or more coil spring assemblies have one pair of coil spring assemblies disposed in positions that are opposed in the radial direction. The pair of coil spring assemblies absorbs 70% to 100% of the twisting torque.

With this damper mechanism, the pair of coil spring assemblies absorbs 70% or more of the twisting torque of the damper mechanism. Therefore, the number of coil spring assemblies can be reduced and the structure of the damper mechanism can be simplified while maintaining the same torsional characteristics as conventional damper mechanisms.

A damper mechanism in accordance with a fourth aspect of the present invention has an input rotating body, an output rotating body, and two or more coil spring assemblies. The two or more coil spring assemblies couple the input rotating body and the output rotating body together elastically in the rotational direction, and serve to absorb twisting torque. Each of the coil spring assemblies has at least one coil spring whose center axis is roughly linear. The angle formed by two radii passing from the center axis of the damper mechanism through the ends of the coil spring is in the range of 60 to 140 degrees.

In this damper mechanism, the coil springs that extend linearly are larger than conventional coil spring because the angle thereof is 60 degrees or greater. Consequently, the number of coil springs can be reduced and the structure of the damper mechanism can be simplified while maintaining the same torsional characteristics as conventional damper mechanisms.

A damper mechanism in accordance with a fifth aspect of the present invention is the damper mechanism of the fourth aspect, wherein the aforementioned angle is in the range of 60 to 120 degrees.

In this damper mechanism, more space can be secured between the coil springs in the circumferential direction because the angle formed by two radii passing from the center axis of the damper mechanism through the ends of the coil spring(s) does not exceed 120 degrees.

A damper mechanism in accordance with a sixth aspect of the present invention is the damper mechanism of the fifth aspect, wherein the angle is in the range of 70 to 100 degrees.

In this damper mechanism, more space can be secured between the coil springs in the circumferential direction because the angle formed by two radii passing from the center axis of the damper mechanism through the ends of the coil spring(s) does not exceed 100 degrees.

A damper mechanism in accordance with a seventh aspect of the present invention has: an input plate, a hub flange, a first elastic member assembly, a splined hub, and a second elastic member assembly. The hub flange is disposed substantially parallel to the input plate in the axial direction. The first elastic member assembly couples the input plate and the hub flange together elastically in the rotational direction. The splined hub is disposed inside the hub flange. The second elastic member assembly couples the splined hub and the hub flange together elastically in the rotational direction. The ratio of the distance between the center axis of the damper and the part of the second elastic member assembly that is farthest from the center axis of the damper to the distance between the center axis of the damper and the part of the first elastic member assembly that is closest to the center axis of the damper is in the range of 1:0.5 to 1:1.5.

In this damper mechanism, the part of the second elastic member assembly that is farthest from the center axis of the damper is disposed farther from the center axis than in conventional damper mechanisms. Thus, the degree of design freedom of the second elastic member assembly is improved.

A damper mechanism in accordance with an eighth aspect of the present invention of the seventh aspect is the damper mechanism wherein the ratio is in the range from 1:0.7 to 1:1.2.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Embodiment 1

Figure 1:
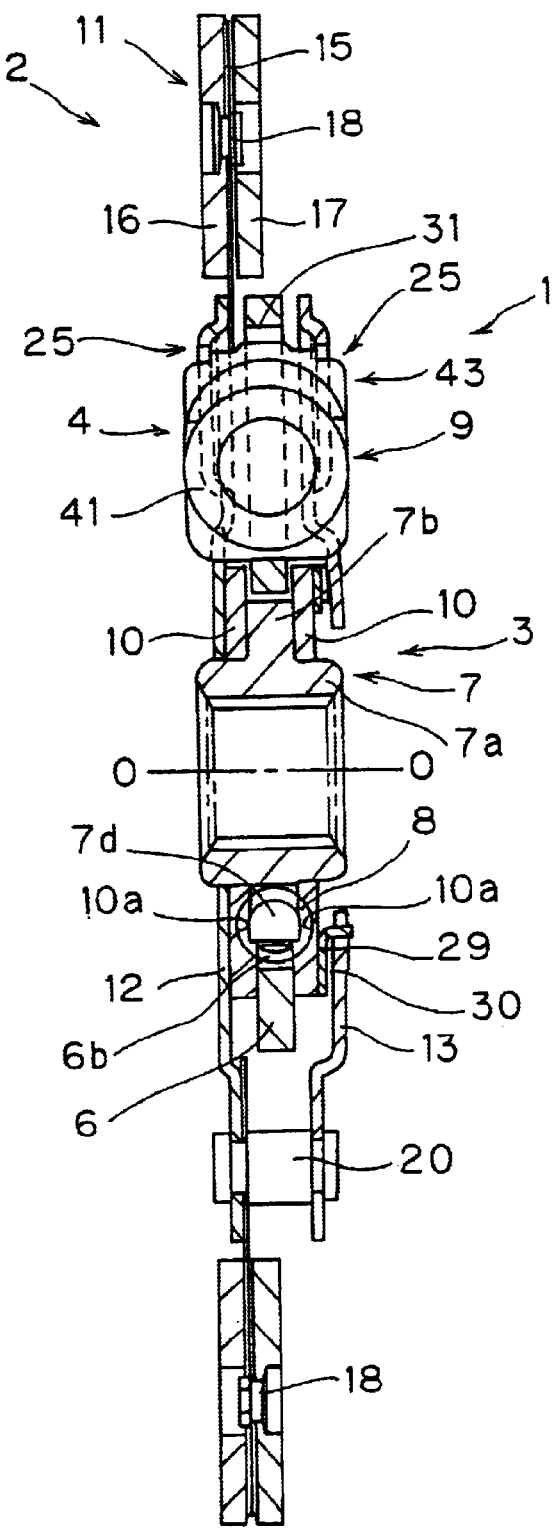
FIG. 1 is a vertical cross sectional view of the clutch disk assembly in accordance with a preferred embodiment of the present invention.
Figure 2:
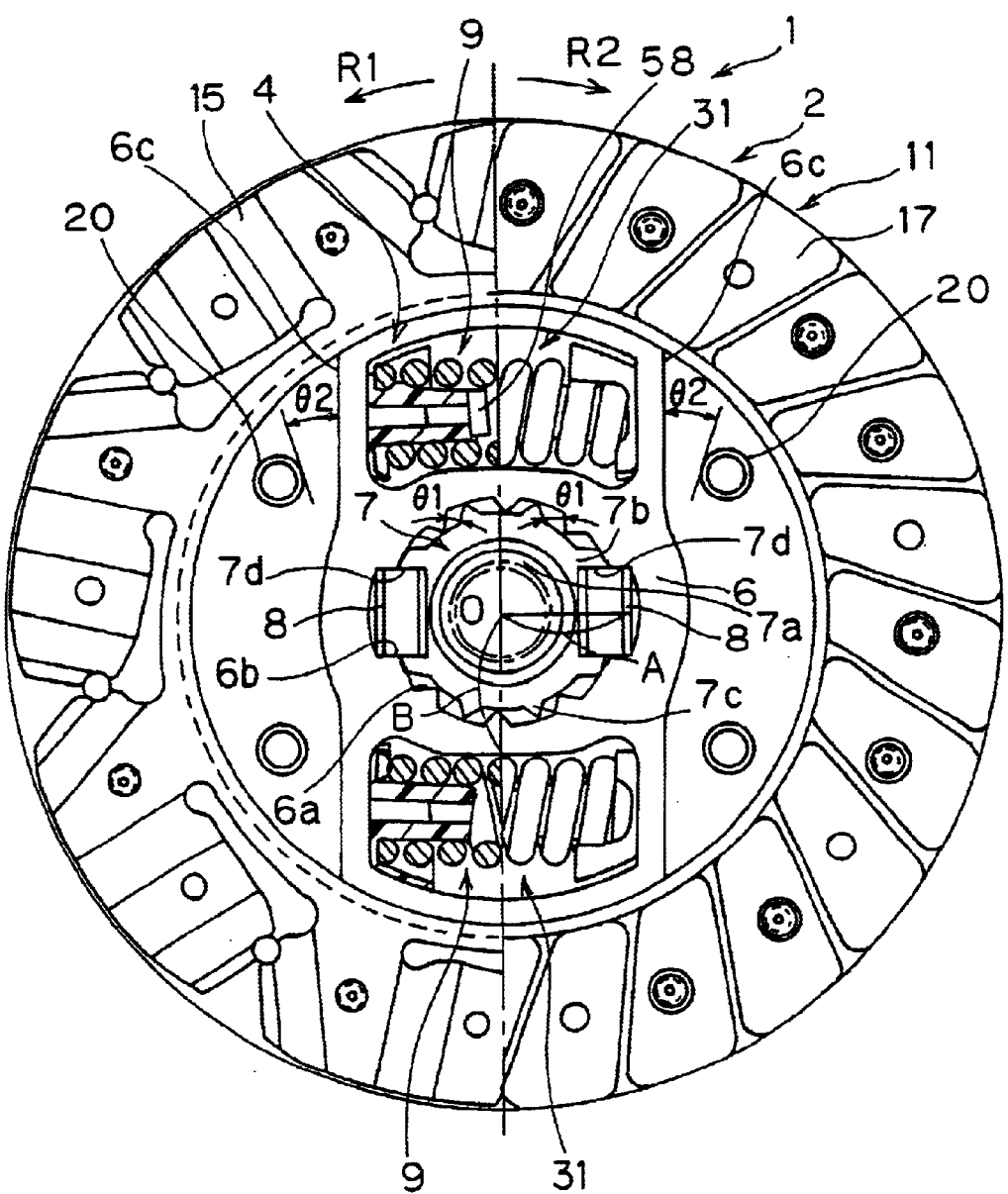
FIG. 2 is an elevational view of the clutch disk assembly of FIG. 1 with a portion removed for illustrative purposes.

FIG. 1 illustrates a cross sectional view of a clutch disk assembly 1 in accordance with a preferred embodiment of the present invention. FIG. 2 shows an elevational view of the same. The clutch disk assembly 1 is a power transmission device used in a vehicle clutch device and has a clutch function and a damper mechanism. The clutch function transmits and interrupts torque by engaging and disengaging a flywheel (not shown). The damper function uses springs or the like to absorb and damp torque fluctuations inputted from the flywheel.

In FIG. 1, line O—O is the rotational axis of the clutch disk assembly 1. An engine and a flywheel (not shown) are disposed to the left in FIG. 1 and a transmission (not shown) is disposed to the right in FIG. 1. In FIG. 2, arrow R1 indicates the drive direction (positive rotation direction) of clutch disk assembly 1 and arrow R2 indicates the opposite direction (negative rotation direction). In the following explanation, the terms "rotational (circumferential) direction," "axial direction," and "radial direction" are used to describe the directions of clutch disk assembly 1 (which serves as a damper mechanism) unless a more specific direction needs to be described.

The clutch disk assembly 1 chiefly has an input rotating body 2, an output rotating body 3, and an elastic coupling part 4 disposed between the input rotating body 2 and the output rotating body 3.

Torque is inputted from the flywheel (not shown) to the input rotating body 2. The input rotating body 2 chiefly has a clutch disk 11, a clutch plate 12, and a retaining plate 13. The clutch disk 11 presses against and couples with the flywheel (not shown). The clutch disk 11 has a cushion plate 15 and a pair of friction facings 16, 17 that are fixed to both axially facing sides of the cushion plate 15 with rivets 18.

The clutch plate 12 and the retaining plate 13 are both disk-shaped, ring-shaped members preferably made of sheet metal and are disposed at a prescribed distance from each other in the axial direction. The clutch plate 12 is disposed on the engine side and the retaining plate 13 is disposed on the transmission side. The clutch plate 12 and the retaining plate 13 are fixed together at their outer circumferential parts by a plurality of stopper pins 20. The stopper pins 20 are preferably four in total and have a stopper function (discussed later) in addition to the function of fixing the plates 12, 13 together. The clutch plate 12 and the retaining plate 13 are each formed with a center hole. A splined hub 7 (discussed later) is disposed inside these center holes.

A plurality of windows 25 that are arranged in the circumferential direction is formed in the clutch plate 12 and the retaining plate 13. For convenience, the shape of the windows 25 is explained using FIG. 8, which illustrates a clutch disk assembly in accordance with a second embodiment of the present invention but utilizes the same window structure. In each plate, two windows 25 are preferably formed so that they oppose each other in the radial direction (in positions that are symmetrical with respect to center axis O—O). The windows 25 are long in the circumferential direction of the plates 12 and 13. Each window 25 has a hole that passes through a plate in the axial direction and a spring support part 27 formed along the edge of the hole. The spring support part 27 has an outside support part 27a, an inside support part 27b, and rotational direction support parts 27c, 27d. The outside support part 27a is curved into a shape that lies roughly on a circle that is concentric with the plates. The inside support part 27b extends almost in a straight line. The rotational direction support parts 27c, 27d extend along straight lines lying roughly on radii of the plates. The entirety of the outside support part 27a and the portions of rotational direction support parts 27c, 27d that are farther from the center axis of the clutch disk assembly have raised parts that support the spring seats 42, 43 in the axial direction.

Referring to FIGS. 1 and 2, the output rotating body 3 will now be explained. The output rotating body 3 has a splined hub 7, a hub flange 6, and coil springs 8. The splined hub 7 is a cylindrical member disposed inside the center holes of the clutch plate 12 and the retaining plate 13. The splined hub 7 is splined to the transmission input shaft (not shown), which is inserted into the center hole of the hub. The splined hub 7 has a boss 7a and a flange 7b formed on the outer circumferential surface thereof. As shown in FIG. 2, a plurality of teeth 7c and a pair of spring housing notches 7d are formed in the flange 7b. The pair of spring housing notches 7d is positioned such that they oppose each other in the radial direction.

The hub flange 6 is arranged on the outer circumference of the splined hub 7. Thus, the hub flange 6 is disposed axially-between the clutch plate 12 and the retaining plate 13. The hub flange 6 is a flat plate member; it is preferably not disk-shaped per se, but rather is relatively elongated in one radial direction. The hub flange 6 has a simple structure and its only punched out parts are preferably a circular center hole and two window holes 31. A plurality of teeth 6a and spring housing notches 6b are formed in the center hole of the hub flange 6.

The spring housing notches 6b correspond to the spring housing notches 7d and are disposed to the outside thereof. The coil springs 8 are disposed inside the spring housing notches 6b, 7d. That is, the portions of the circumferentially facing end faces of the coil springs 8 that are closer to the center axis of the clutch disk assembly 1 are supported by the circumferentially facing end faces of the notches 7d. Further the portions of the circumferentially facing end faces of the coil springs 8 that are farther from the center axis of the clutch disk assembly 1 are supported by the circumferentially facing end faces of the notches 6b. Also, it is acceptable either to have or not to have a spring seat engaged with the circumferentially facing end faces of coil springs 8.

The plurality of teeth 6a is arranged so as to be separated from the plurality of teeth 7c by a space (θ1) in the rotational direction. This rotational-direction space is the operating angle of the coil springs 8, and teeth 6a, 7c constitute a first stage stopper mechanism.

As shown in FIG. 1 a pair of plates 10 is disposed on the outer circumference of the splined hub 7. Each plate 10 is preferably a ring-shaped member and a bushing that functions as a prescribed friction material. A structure that is not shown in the figure makes the plates 10 rotate together with the hub flange 6. The plate 10 on the engine side is sandwiched between the inner part of the clutch plate 12 and the flange 7b of the splined hub 7. The plate 10 on the transmission side is in contact with the flange 7b of the splined hub 7.

A friction plate 29 and a cone spring 30 are disposed between the transmission-side plate 10 and a portion of the retaining plate 13 that is close to the center axis. The friction plate 29 is engaged with the retaining plate 13 in such a manner that it cannot rotate with respect to the retaining plate 13 but can move in the axial direction with respect to the retaining plate 13. The cone spring 30 is compressed in the axial direction between the friction plate 29 and the retaining plate 13 and applies a force against the friction plate 29 in the axial direction toward the engine.

Recessed parts 10a are formed in the mutually opposing faces of the plates 10 at positions corresponding to the spring housing notches 6b, 7d. The two sides of each coil spring 8 that face in the axial direction of the clutch disk assembly 1 are disposed inside recessed parts 10a. The two sides of the circumferentially facing end faces of each coil spring 8 that correspond to the aforementioned two sides are supported by the end faces of the recessed parts 10a. Thus, the plates 10 support both circumferentially facing ends of each coil spring 8 as well as both axially facing sides of the same.

Figure 3:
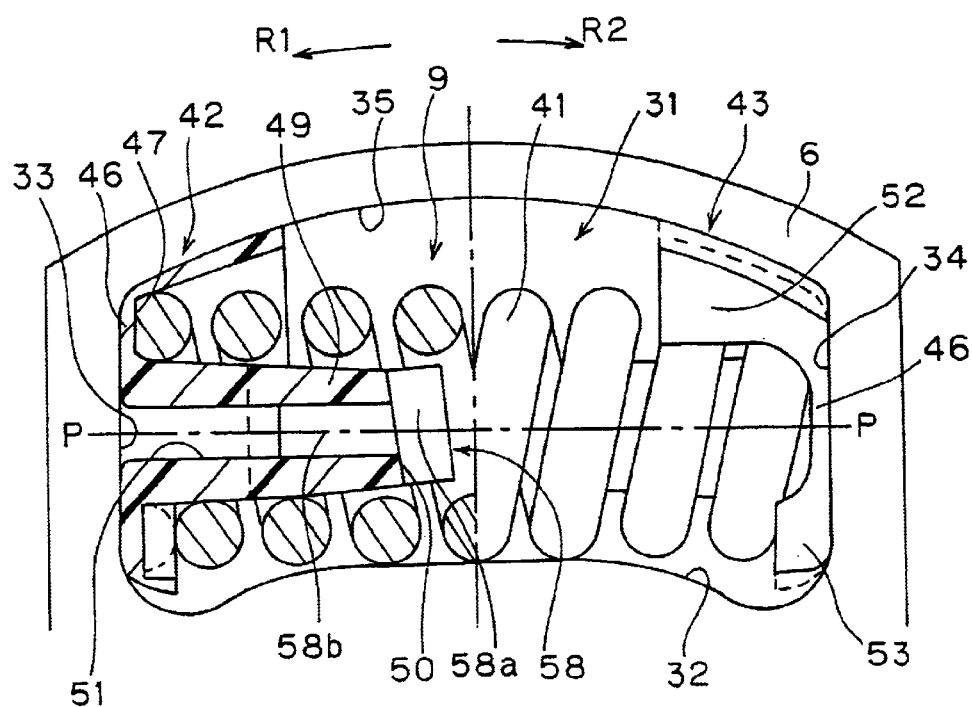
FIG. 3 is an enlarged partial view illustrating a coil spring assembly of the clutch disk assembly of FIG. 2.

The window holes 31 are formed in the hub flange 6 so as to correspond to the windows 25 in the plates 12, 13. That is, a pair of window holes 31 is formed in the hub flange 6 at positions such that they oppose each other in the radial direction. The window holes 31 are preferably formed such that they pass through the hub flange 6 in the axial direction. As shown in FIG. 3, each window hole 31 preferably has an outside support part 35, an inside support part 32, and rotational direction support parts 33, 34. The rotational direction support part 33 is disposed on the R1 side and the rotational direction support part 34 is disposed on the R2 side. The outside support part 35 is curved so as to lie on a circle that is substantially concentric with the center axis of the clutch disk assembly 1. The rotational direction support part 33 and the rotational direction support part 34 extend linearly so as to lie roughly parallel to a radius extending from the center of the clutch disk assembly 1 through the middle of the window hole 31.

The elastic coupling part 4 chiefly has a plurality of coil spring assemblies 9 as seen in FIG. 2. Each coil spring assembly 9 is disposed inside a window hole 31 and a window part 25. Each coil spring assembly 9 has a coil spring 41 and a pair of spring seats 42, 43 provided on the both ends thereof. The cross section of the wire of coil spring 41 is preferably circular and both ends thereof form closed-end end coils. The surface parts of the end coils are preferably slightly ground.

Figure 5:
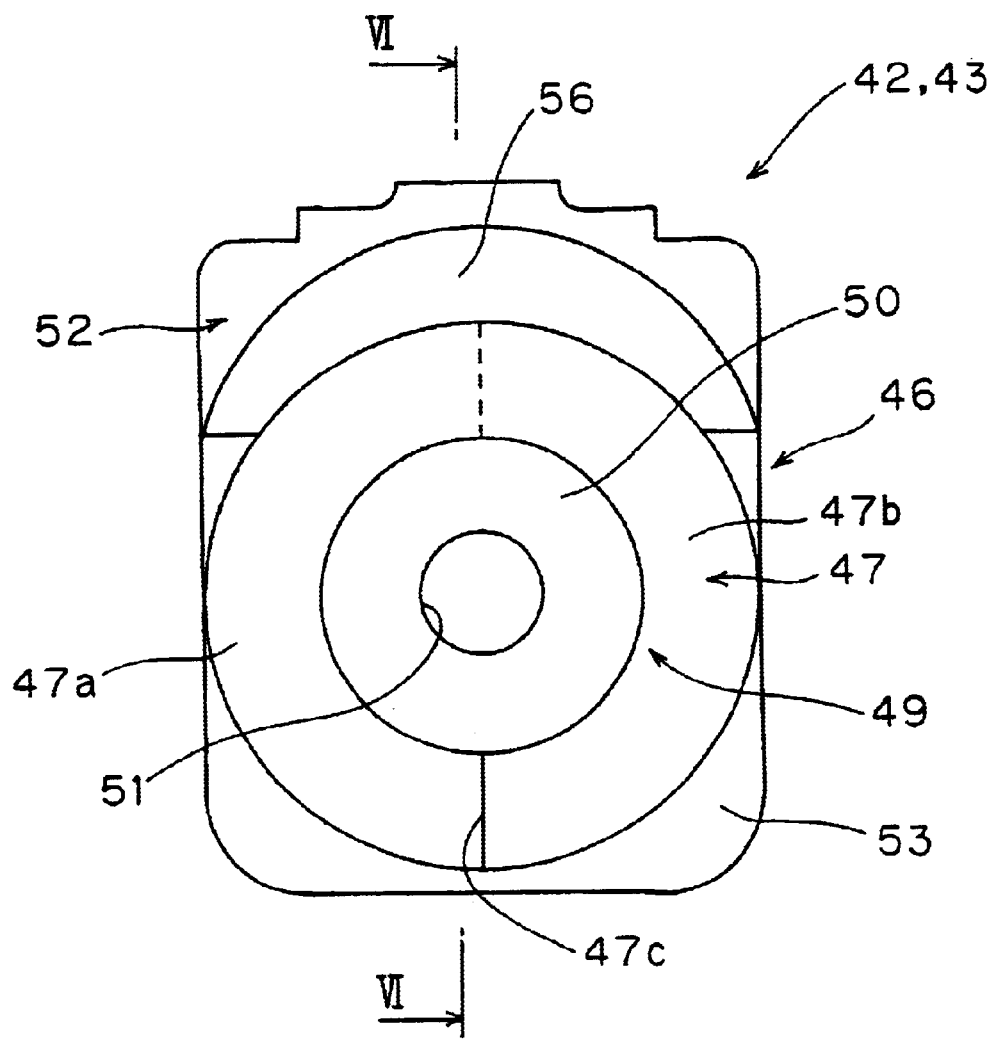
FIG. 5 is a frontal view of a spring seat of the coil spring assembly of FIG. 4.
Figure 6:
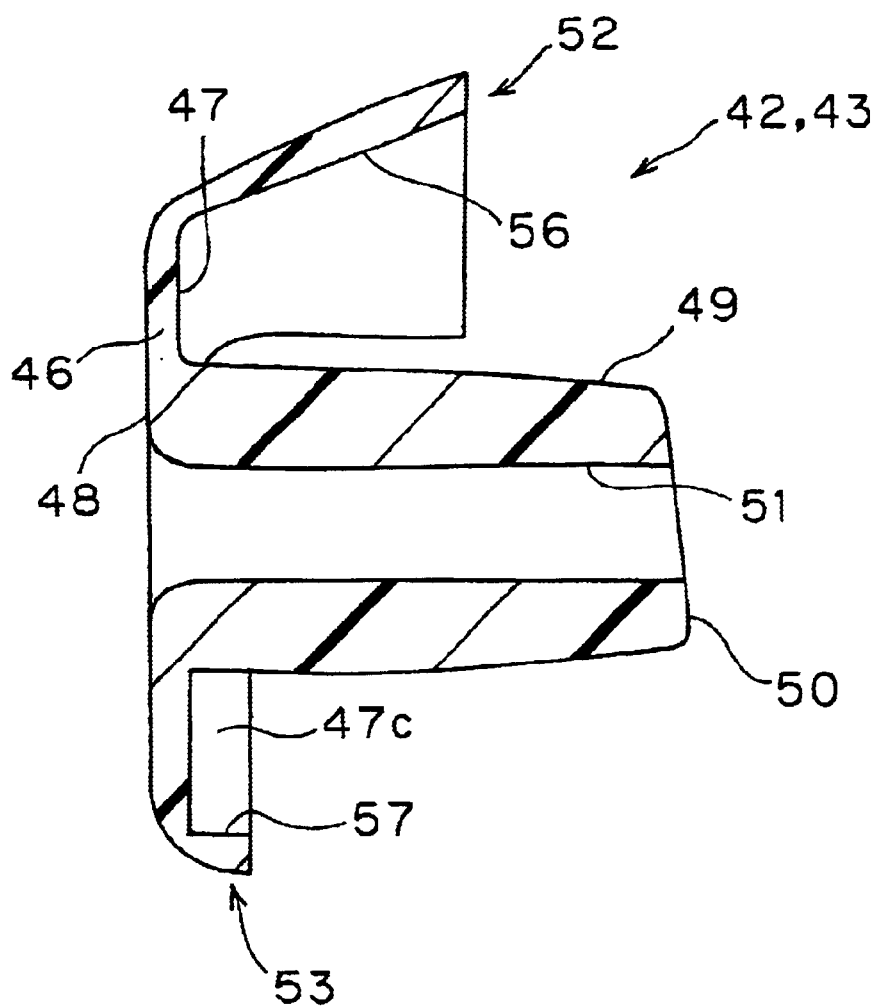
FIG. 6 is a cross sectional view of a spring seat of the coil spring assembly of FIG. 3.

The spring seats 42, 43 are preferably made of a rigid resin or elastic resin material as best seen in FIGS. 5 and 6. An example of an elastic resin material is thermal-plastic polyester elastomer. Each seat part 46 of the spring seats 42, 43 have a seat surface 47 for bearing the end coil surface parts of the coil spring 41. The opposite side of the seat part 46 has a rear surface 48 supported by window hole 31 and window 25.

As best seen in FIG. 5, seat surface 47 is circular. The seat surface 47 has a first semicircle 47a and a second semicircle 47*b* that is slanted in such a manner that its surface gradually becomes higher as one moves from one end of first semicircle 47*a* toward the other end thereof (clockwise in the elevational view of FIG. 5). One end of the second semicircle 47*b* is formed to continue from first semicircle 47*a* and the other end of second semicircle 47*b* forms a step with respect to first semicircle 47*a*. As seen in FIGS. 5 and 6, a contact surface 47*c* that faces in the circumferential direction of seat surface 47 (clockwise in FIG. 5) is formed on this step portion. The shape of the seat surface 47 matches the shape of the end coil surface part of the coil spring 41; when the end coil has not been significantly ground, it acceptable for the seat surface 47 to have a curved cross section that matches the cross section of the coil. The tip end part of the coil spring 41 touches against the contact surface 47*c* of the spring seat 42.

Since the spring seat 43 has substantially the same shape as the spring seat 42, when the two spring seats 42 and 43 are disposed to face each other, the two contact surfaces 47*c* face in opposite directions in terms of the circumferential direction of the seat surface.

The seat part 46 is formed with a projection 49 that extends into the window hole 31 in the circumferential direction of the clutch disk assembly and fits inside the coil spring 41. The projection 49 is roughly cylindrical in shape. The tip surface 50 of the projection 49 is preferably straight in the axial direction of the clutch disk assembly but is slanted when viewed perpendicular to the axial direction. Specifically, when viewed elevationally and perpendicularly the axis of rotation the portion of the tip surface 50 that is farther from the center of the clutch disk assembly is positioned more toward the edge of the window hole 31 in the rotational direction than the portion thereof that is closer to the center of the clutch disk assembly. Also, a hole 51 is preferably formed through the seat part 46 and the projection 49.

As shown in FIG. 3, a rubber 58 is attached to the tip of the projection 49 of the spring seat 42. The rubber 58 has a cushion part 58*a* that contacts the tip surface 50 and a leg part 58*b* that extends from the cushion part 58*a* into the hole 51. The rubber 58 serves to generate a large torque (stopper torque) by being pinched between the projections 49 of spring seats 42, 43 when the compression of the coil spring 41 is large.

An outside support part 52 is formed on the same surface of the seat part 46 as the projection 49 on the side of the seat part 46 that is farther from the center axis of the clutch disk assembly 1. As seen in FIGS. 5 and 6 the inside of the outside support part 52 has a support surface 56 that is curved so as to follow the shape of the seat surface 47. The support surface 56 supports not only the end coil of the coil spring 41 but also a portion of both sides of the coil spring 41 that face in the axial direction of the clutch disk assembly 1. Meanwhile, an inside support part 53 is formed on both sides of the seat part 46 in the axial direction on the side of the seat part 46 that is closer to the center axis of the clutch disk assembly 1. The inside support part 53 has a support surface 57 that is curved so as to follow the shape of the seat surface 47. The inside support part 53 supports both axially facing sides of the coil spring 41 as well as the side that is closest to the center axis of the clutch disk assembly 1.

Figure 4:
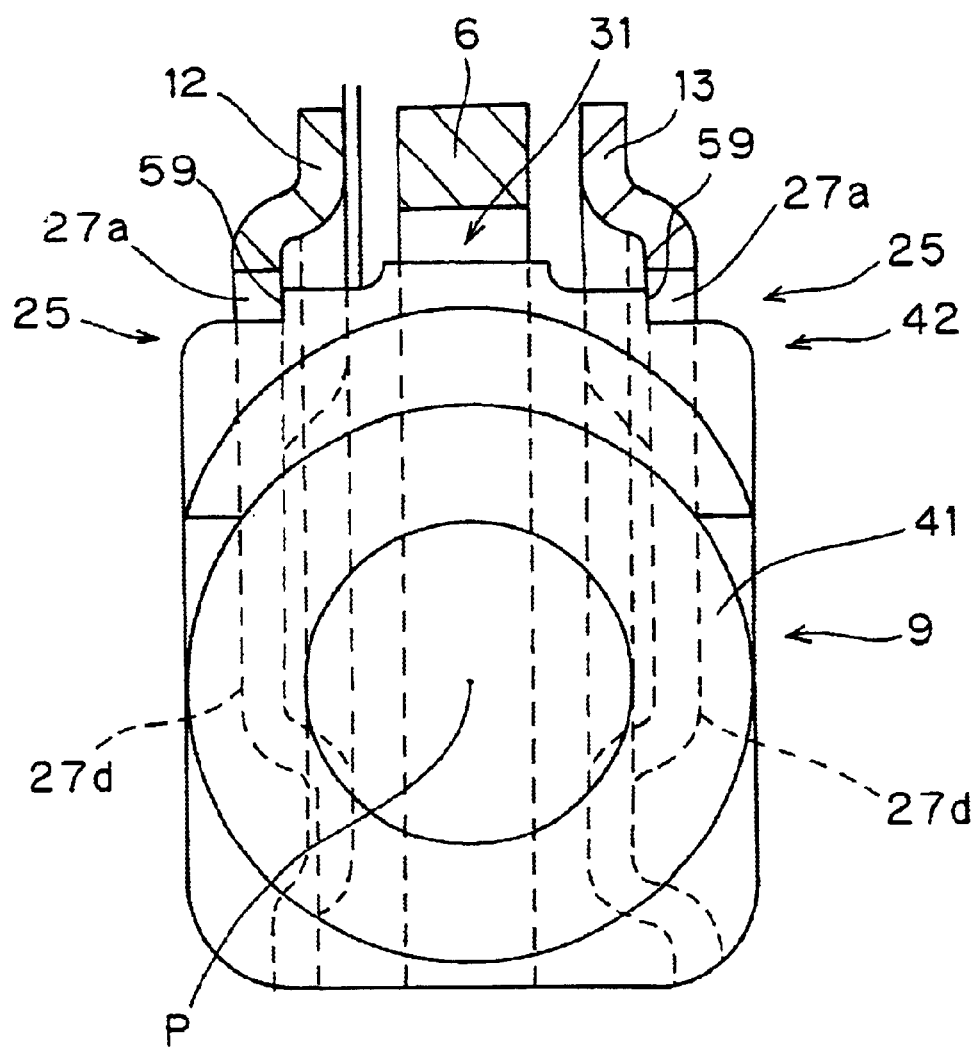
FIG. 4 is an enlarged partial view illustrating a coil spring assembly of the clutch disk assembly of FIG. 1.

The spring seats 42 and 43 can separate from the circumferentially facing ends of the windows 25 in the rotational direction (toward the opposite end in the circumferential direction) but they cannot move in the axial direction or the radial direction when they are engaged as shown in FIGS. 3 and 4. Furthermore, the spring seats 42, 43 are arranged such that they cannot rotate with respect to the clutch plate 12 and the retaining plate 13 about a center axis P—P of the coil spring 41. For example, as shown in FIG. 4, the outside support part 27*a* touches the step part 59 on the side of spring seat 42, 43 that is farther from the center axis of the clutch disk assembly 1.

Referring again to FIG. 3, the spring seats 42 and 43 are supported by the rotational direction support part 33 and the rotational direction support part 34, respectively, of the window hole 31. More specifically, the rear surface 48 contacts the rotational direction support part 33 and the rotational direction support part 34. Furthermore, the outside support part 52 touches the outside support part 35. Meanwhile a slight gap is secured between the inside support part 53 and the inside support part 32 in the radial direction. In this state, the spring seats 42, 43 can separate from the circumferentially facing ends of the window hole 31 in the rotational direction (toward the opposite end in the circumferential direction) but they cannot move in the axial and radial directions when engaged. Also, the spring seats 42, 43 are latched to the hub flange 6 so that they cannot rotate about the center axis P—P of the coil spring 41 due to contact between the outside support part 52 and the outside support part 35 of the window hole 31.

As seen in FIGS. 3 and 5, the entire surface of each circumferentially facing end face of the coil spring 41 touches the seat surface 47 of the seat part 46. Furthermore, the tip end parts of the coil spring 41 touch the contact surfaces 47*c*. Thus, the coil spring 41 cannot rotate about its own center axis P—P with respect to the pair of spring seats 42, 43. That is, the coil spring 41 cannot rotate in either direction about the center axis P—P because the contact surfaces 47*c* of the pair of spring seats 42, 43 face in opposite directions with respect to the coil direction of the coil spring 41. In this condition, there are seven active coils on the side of the coil spring 41 that is closer to the center axis of the clutch disk assembly 1 and six active coils on the side that is farther from the center axis of the clutch disk mechanism. That is, the number of active coils on the side that is closer to the center axis of the clutch disk mechanism is larger than the number of active coils on the side that is farther from the center axis of the clutch disk mechanism. Furthermore, the coil spring 41 does not rotate with respect to the spring seats 42, 43 about the spring center axis P—P, and the spring seats 42, 43 do not rotate with respect to the plates 12, 13 about the spring center axis P—P. Consequently, the coil spring 41 does not move out of position and, thus, the number of active coils on the side that is closer to the center axis of the clutch disk mechanism is always larger than the number of active coils on the side that is farther from the center axis of the clutch disk mechanism.

As seen in FIG. 2, at the portion of the hub flange 6 where the window holes 31 are formed, both edge faces 6*c* are linear and disposed to be separated from the respective stopper pins 20 by a gap (θ2) in the rotational direction. This rotational direction gap is the operating angle of the coil spring assembly 9. The edge faces 6*c* of the hub flange 6 and the pins 20 constitute a second stage stopper mechanism.

Thus, constituted as described heretofore, the damper mechanism of the clutch disk assembly 1 is arranged so that the low torsional rigidity damper formed by the coil springs 8 and the high torsional rigidity damper formed by the coil spring assemblies 9 operate in series. More specifically, the coil springs 8 elastically couple the splined hub 7 and the hub flange 6 together in the rotational direction. Further the coil spring assemblies 9 elastically couple the hub flange 6 and the plates 12, 13 together in the rotational direction. The coil springs 8 accomplish a so-called first stage damping (i.e., a low-rigidity region for absorbing small vibrations during idling) due to their torsional characteristics, and the coil springs 41 accomplish a so-called second stage damping (i.e., a high-rigidity region for damping torsional vibrations during acceleration).

Here, the structure is described in further detail. The two coil spring assemblies 9 are disposed in two locations that are opposite each other in the radial direction. The reason the number of coil spring assemblies 9 can be reduced in comparison with conventional damper mechanisms is that the coil springs 41 of the coil spring assemblies 9 do not rotate about their own center axes and thus, the number of active coils on the side that is closer to the center axis of the clutch disk mechanism is always larger than the number of active coils on the side that is farther from the center axis of the clutch disk mechanism. Since the strength and durability of the coil springs 41 are improved, torque capacity of each coil spring can be increased. More specifically, at least one of the two coil spring assemblies 9 can absorb 35% or more (more specifically 35 to 50%) of the twisting torque of the damper mechanism and the two coil spring assemblies 9 can absorb 70% or more (more specifically 70 to 100%) of the twisting torque. Thus, the two coil springs 41 provide the same twisting torque and rigidity as, for example, four coil springs in a conventional damper mechanism.

Also, since there are only two coil spring assemblies 9 the layout is simpler and the shape of the hub flange 6, etc., are simpler. This means higher yields during the manufacture of each member. The degree of design freedom for the entire clutch disk is also increased. In short, with this structure, the number of coil spring assemblies can be reduced and the structure of the damper mechanism can be simplified while maintaining the same torsional characteristics as conventional damper mechanisms.

Additionally, since a large space is formed between the two coil spring assemblies 9 in the circumferential direction, the degree of design freedom for the first stage coil springs 8, which is located at an intermediate position in the circumferential direction, is improved. More particularly, the two coil springs 8 are positioned midway between the two coil springs 9 in the circumferential direction and thus, their position is not limited by the coil springs 9 in the radial direction. More specifically, the small coil springs 8 can be given larger coil diameters and positioned farther from the center axis of the clutch disk assembly 1 than in the case of conventional damper mechanisms. Here, it is preferable for the ratio of the distance A between the center axis of the damper and the part of the coil spring 8 that is farthest from the center axis of the damper to the distance B between the center axis of the damper and the part of the coil spring 41 that is closest to the center axis of the damper to be in the range of 1:0.5 to 1:1.5. It is even more preferable for this ratio to be in the range of 1:0.7 to 1:1.2.

Next, the twisting operation of the damper mechanism of clutch disk assembly 1 will be explained. Assume that the plates 12, 13 are twisted in the rotational direction with respect to the hub flange 6 in a free state. If the twisting angle is small, the coil springs 8, which have the lowest rigidity, will be compressed between the splined hub 7 and the hub flange 6 and low-rigidity characteristics will be realized. When this occurs, the hub flange 6 will rotate relative to the splined hub 7 and, consequently, the plates 10 will slide along the flange 7b of the splined hub 7 such that the desired hysteresis torque is generated. If twisting continues and the teeth 7c contact the teeth 6a, the coil springs 41 will be compressed between the hub flange 6 and the plates 12, 13.

When this occurs, the hub flange 6 will rotate relative to the plates 12, 13. Consequently, the plate 10 will slide along the clutch plate 12 and the friction plate 29 such that the desired hysteresis torque is generated.

The coil springs 41 of the coil spring assemblies 9 are compressed in the rotational direction between the rotational direction support parts 33 of the window holes 31 and the rotation direction support parts 27c, 27d of the windows 25. When this occurs, the deflection of each coil spring 41 is larger on the side that is farther from the center axis of the clutch disk assembly 1 than on the side that is closer to the center axis of the clutch disk assembly 1. However, since the number of coils on the side that is closer to the center axis is larger than the number of coils on the side that is farther from the center axis, the difference in the per-coil deflection between the two sides is smaller than in conventional damping mechanisms. That is, the difference between the per-coil deflection on the side that is farther from the center axis is larger than the per-coil deflection on the side that is closer to the center axis, but that difference is smaller than in conventional damping mechanisms. As a result, it is difficult for there to be a difference in the generated stress between the portion of the coil spring 41 that is closer to the center axis of the clutch disk assembly 1 and the portion that is farther from the center axis of the clutch disk assembly 1. In other words, there is little difference between the stress generated in the portion of each coil that is farther from the center axis of the clutch disk assembly 1 and the stress generated in the portion of each coil that is closer to the center axis of the clutch disk assembly 1. As a result, the life of the coil spring 41 is extended.

In this embodiment, the center axis P—P of the coil spring 41 is roughly linear.

Also, the angle occupied by each coil spring 41 in the circumferential direction (i.e., the angle formed by two radii passing from center axis O—O to the ends of the coil spring 41 on the side of the coil spring 41 that is closest to the center axis) is roughly 80 degrees. When the angle occupied by linear coil springs in the circumferential direction is 60 degrees or larger, the coil springs are larger than in conventional damper mechanisms. Thus, the number of coil springs can be reduced and the structure of the damper mechanism can be simplified while maintaining the same torsional characteristics as conventional damper mechanisms. However, it is best to keep this circumferential angle as small as possible from the standpoint of securing space between the coil springs 41 in the circumferential direction. Therefore, a good effect can be obtained if the circumferential angle occupied by the coil springs is in the range from 60 to 140 degrees. Furthermore, it is better if the circumferential angle is in the range from 60 to 120 degrees or, still more preferable, in the range from 70 to 100 degrees.

Embodiment 2

Figure 7:
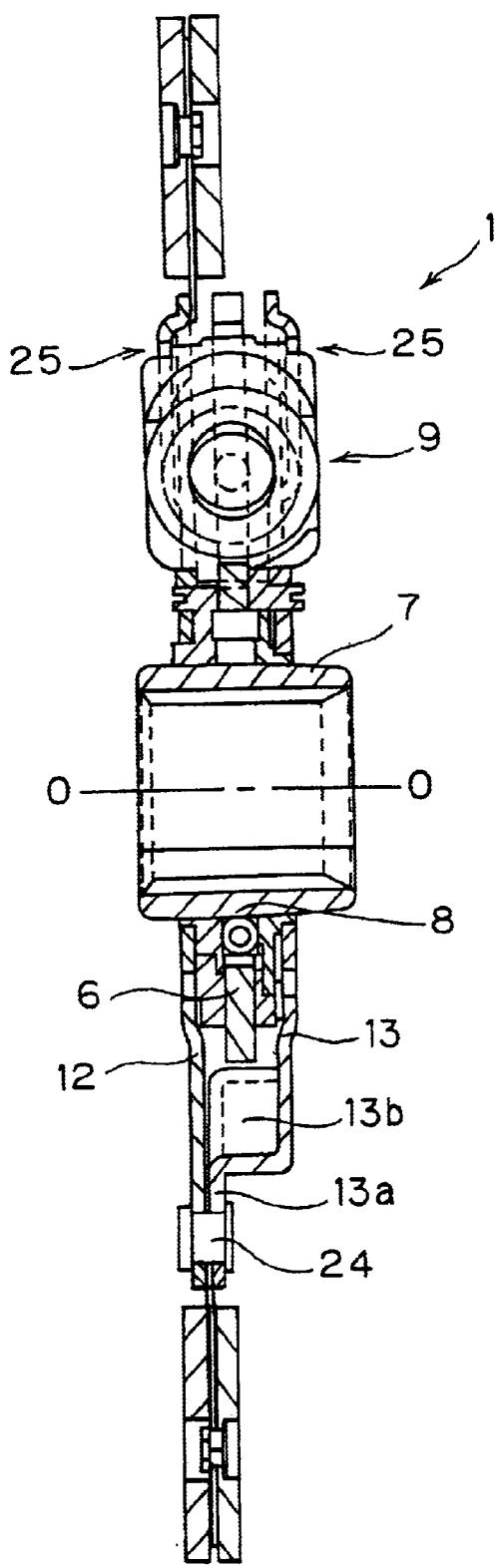
FIG. 7 is a vertical cross sectional view of the clutch disk assembly of an alternated embodiment of present invention.
Figure 8:
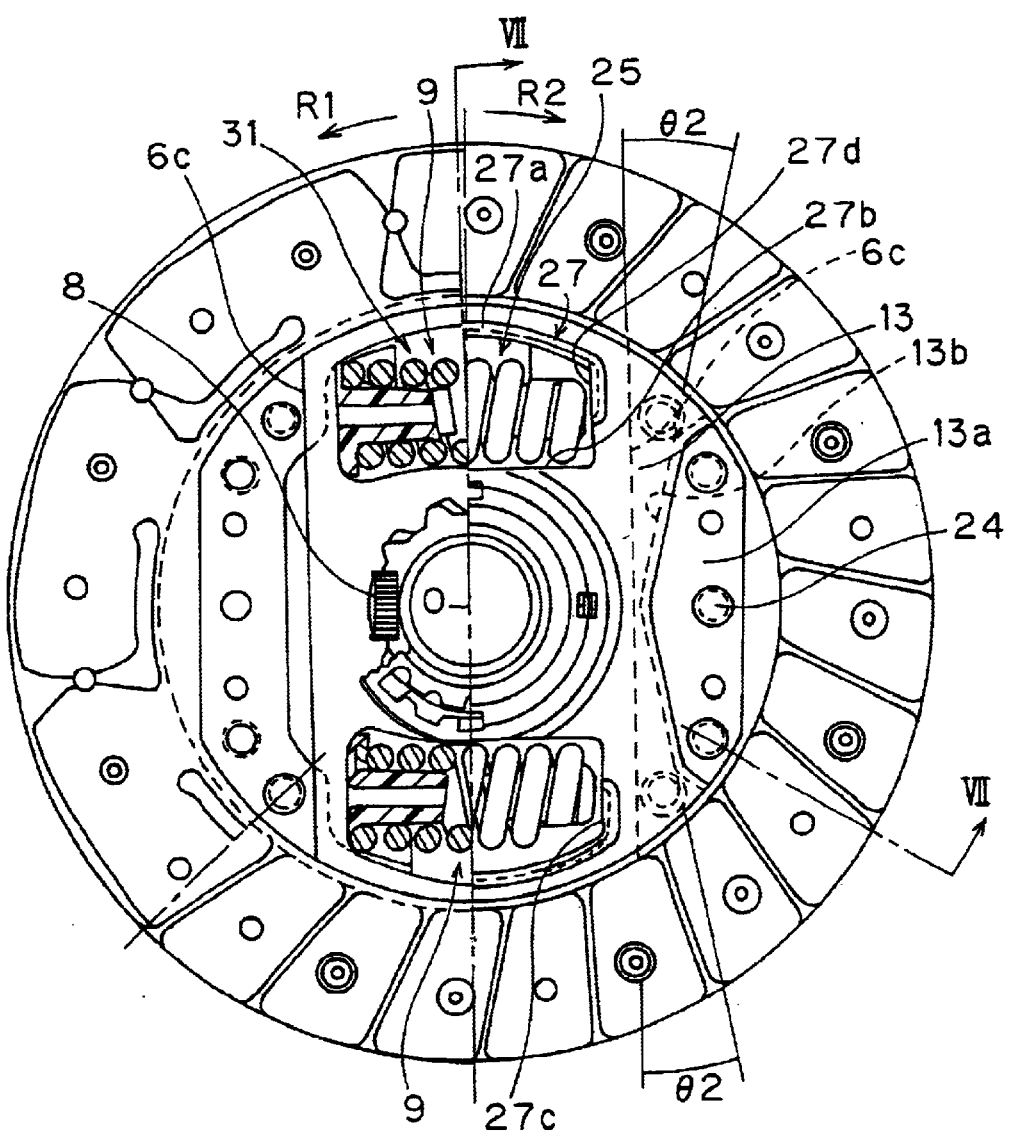
FIG. 8 is an elevational view of the clutch disk assembly of FIG. 7.

Referring primarily to FIGS. 7 and 8, a clutch disk assembly in accordance with the second embodiment of the present invention will now be discussed. In view of the similarities between this embodiment and first embodiment, discussed above, the components or parts of this embodiment that have the same function of the corresponding components or parts of the embodiment are being given the identical reference numerals. Moreover, the explanations of components or parts and the operations of this embodiment that are similar to components or parts and the operations of the first embodiment will be omitted. Only components and operations of this embodiment that are different in structure and function from the first embodiment will be explained herein.

Embodiment 2 employs a variation on the stopper mechanism that stops the compression of the coil spring assemblies 9. Here, this variation is explained.

In this embodiment, a coupling part 13a is formed on the retaining plate 13 at a portion that is farther from the center axis of the clutch disk assembly than is the coil spring 8. The coupling part 13a is formed by drawing and protrudes toward the clutch plate 12. The coupling part 13a is fixed to the clutch plate 12 by a plurality of rivets 24. A wall part 13b that extends in the axial direction is formed at the boundary between coupling part 13a and the other portion. A gap of a prescribed angle ($\theta 2$) is secured between the wall part 13b and the circumferentially facing edge face 6c of the window hole 31 in the hub flange 6. That is, the edge face 6c of the hub flange 6 and the wall part 13b of the retaining plate 13 constitute the stopper mechanism for the coil spring assembly 9. With this arrangement, it is not necessary to use stopper pins and, consequently, a lighter clutch disk assembly can be realized.

Thus, both the task of fastening together the two plates disposed on either side of the hub flange and the task of constructing a stopper mechanism are accomplished using a portion of one of the plates.

A portion of the clutch plate may also be used to construct the stopper mechanism.

Other Embodiments

The structure used to stop the coil springs from rotating about their own axes with respect to the plate and hub flange is not limited to that used in the previous embodiments. For example, the coil springs can be stopped from rotating about their own axes with respect to said members without using spring seats.

Also, even if spring seats are used, the structure used to stop the coil springs from rotating about their own axes with respect to the plate and hub flange is not limited to that used in the previous embodiments.

The end windings of the coil spring may be slightly ground, as in the previous embodiments, or not ground at all.

In the previous embodiments, the end parts of the coil springs were close-ended but open-ended coil springs may also be used. Also, the number of windings, the winding direction, and the cross sectional shape of the coil springs are not limited to those used in the previous embodiments.

The constituent features of the clutch disk assembly are not limited to those of the previous embodiments.

The coil spring assemblies and damper mechanisms described in the present application can be used in other power transmission devices in addition to clutch disk assemblies. For example, the present invention can be applied to a flywheel assembly that elastically couples two flywheels together in the rotational direction or to a lockup device for a torque converter.

A damper mechanism in accordance with the present invention has a simple structure because the number of coil spring assemblies is small.

The terms of degree such as "substantially," "about," and "approximately" as used herein mean a reasonable amount of deviation of the modified term such that the end result is not significantly changed. These terms should be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A damper mechanism, comprising:

an input rotating body;

an output rotating body; and two or more coil spring assemblies being configured to couple elastically said input rotating body and said output rotating body together in a rotational direction, said coil spring assemblies configured to absorb twisting torque, each of said coil spring assemblies having at least one coil spring with a roughly linear center axis, and a pair of spring seats configured to contact said coil spring at opposite ends, said spring seats being configured to prevent rotation of said coil spring around a coil spring axis of said coil spring, and at least one of said two or more coil spring assemblies being configured to absorb 35% to 50% of said twisting torque.

2. A damper mechanism according to claim 1, wherein said coil springs are mounted such that the number of active coils on the side that is closer to a center axis of the damper mechanism is larger than the number of active windings on the side that is farther from said center axis of the damper mechanism.

3. A damper mechanism according to claim 2, wherein said two or more coil spring assemblies include one pair of coil spring assemblies disposed in positions that are opposed in a radial direction, and said one pair of coil spring assemblies absorbs at least 70% of said twisting torque.

4. A damper mechanism according to claim 1, wherein said two or more coil spring assemblies include one pair of coil spring assemblies disposed in positions that are opposed in a radial direction, and said one pair of coil spring assemblies absorbs at least 70% of said twisting torque.

5. A damper mechanism comprising:

an input rotating body;

an output rotating body; and two or more coil spring assemblies being configured to couple elastically said input rotating body and said output rotating body together in a rotational direction, said two or more coil spring assemblies being configured to absorb twisting torque, each of said coil spring assemblies having at least one coil spring with a roughly linear center axis, and a pair of spring seats configured to contact said coil spring at opposite ends, said spring seats being configured to prevent rotation of said coil spring around a coil spring axis of said coil spring, and an angle formed by two radii passing from a center axis of the damper mechanism through ends of said coil spring being in the range of 60 to 140 degrees.

6. A damper mechanism according to claim 5, wherein said angle is in the range of 60 to 120 degrees.

7. A damper mechanism as recited in claim 6, wherein said angle is in the range of 70 to 100 degrees.

8. A damper mechanism comprising:

an input plate rotatable around an axis;

a hub flange being disposed adjacent said input plate and rotatable around said axis;

a first elastic member assembly being configured to couple elastically said input plate and said hub flange together in a rotational direction, said first elastic member assembly having a first elastic member coil spring, and a pair of spring seats configured to contact said first elastic member coil spring at opposite ends, said spring seats being configured to prevent rotation of said first elastic member coil spring around a coil spring axis of said first elastic member coil spring;

a splined hub being disposed inside said hub flange; and a second elastic member assembly being configured to couple elastically said splined hub and said hub flange together in said rotational direction, a ratio of a distance between said axis and a part of said second elastic member assembly being farthest from said axis of the damper to the distance between said axis of the damper and a part of said first elastic member assembly being closest to said axis of the damper being in the range of 1:0.5 to 1:1.5.

9. A damper mechanism as according to claim 8, wherein said ratio is in the range of 1:0.7 to 1:1.2.

10. The damper mechanism according to claim 8, wherein, said first elastic member assembly and said second elastic member assemblies operate substantially in series, said first elastic member assembly having a higher rigidity than said second elastic member assembly.

11. The damper mechanism according to claim 10, further comprising, two first elastic member assemblies, and two second elastic member assemblies.

12. The damper mechanism according to claim 11, wherein each first elastic member assembly comprises a first elastic member coil spring extending substantially in a circumferential direction perpendicular to said axis of the damper.

13. The damper mechanism according to claim 11, wherein said two second elastic member assemblies are arranged diametrically opposite each other.

14. The damper mechanism according to claim 13, wherein said two first elastic member assemblies are arranged diametrically opposite each other.

15. The damper mechanism according to claim 10, further comprising, a first stage stopper mechanism to prevent relative rotation of said splined hub and said hub flange, and a second stage stopper mechanism to prevent relative rotation of said input plate and said hub flange.

16. The damper mechanism according to claim 15, wherein said second stage stopper mechanism comprises rivets configured to contact said hub flange to prevent relative rotation of said hub flange and said input plate.

17. The damper mechanism according to claim 15, wherein said second stage stopper mechanism comprises at least one plate configured to contact said hub flange to prevent relative rotation of said hub flange and said input plate.

18. The damper mechanism according to claim 17, wherein said second stage stopper mechanism comprises two plates disposed on radially opposing sides of said hub flange to prevent relative rotation of said hub flange and said input plate.

19. The damper mechanism according to claim 18, wherein said second stage stopper mechanism is formed of part of said input plate.

20. The damper mechanism according to claim 8, wherein said first elastic member coil spring has a inner radial side and an outer radial side, said inner radial side is closer to said axis of the damper than said outer radial side, and said first elastic member coil spring configured to have a greater number of active coils on said outer radial side than said inner radial side.

* * * * *